(12) United States Patent
Tanno et al.

(10) Patent No.: US 7,515,809 B2
(45) Date of Patent: Apr. 7, 2009

(54) HEAT-RESISTING PLASTIC OPTICAL FIBER AND MANUFACTURING METHOD THEREOF

(75) Inventors: Seikichi Tanno, Hitachi (JP); Tomiya Abe, Hitachi (JP); Masanori Matsumoto, Hitachi (JP)

(73) Assignee: Hitachi Cable Ltd., Tokyo (JP)

( * ) Notice: Subject to any disclaimer, the term of this patent is extended or adjusted under 35 U.S.C. 154(b) by 0 days.

(21) Appl. No.: 11/874,300

(22) Filed: Oct. 18, 2007

(65) Prior Publication Data

US 2008/0205836 A1    Aug. 28, 2008

(30) Foreign Application Priority Data

Feb. 28, 2007    (JP) .............................. 2007-049776

(51) Int. Cl.
  *G02B 6/00*    (2006.01)
(52) U.S. Cl. ..................... 385/143; 385/141; 385/142
(58) Field of Classification Search ................ 385/141, 385/142, 143
  See application file for complete search history.

(56) References Cited

U.S. PATENT DOCUMENTS 4,919,513 A * 4/1990 Nakakuki et al. ........... 385/127

FOREIGN PATENT DOCUMENTS

| JP | 57-102604 | 6/1982 |
|---|---|---|
| JP | 58-16163 | 3/1983 |
| JP | 6-14127 | 2/1994 |
| JP | 2004-212712 | 7/2004 |

OTHER PUBLICATIONS

Kyoritsu Shuppan, Plastic Optical Fiber edited by POF consortium, pp. 79-120 (1997).

* cited by examiner

*Primary Examiner*—Jennifer Doan
(74) *Attorney, Agent, or Firm*—Mattingly, Stanger, Malur & Brundidge, PC

(57) ABSTRACT

A heat-resisting plastic optical fiber which excels in heat resistance and mass production and a manufacturing method thereof. The heat-resisting plastic optical fiber has a core which consists of transparent resin, and clad coated on the outer periphery of the core, which consists of the resin whose refractive index is lower than that of core. Precursor of material for the core material consists of the mixture of a group of monomers which contain polyfunctional monomer and transparent thermoplastic polymer.

8 Claims, 2 Drawing Sheets

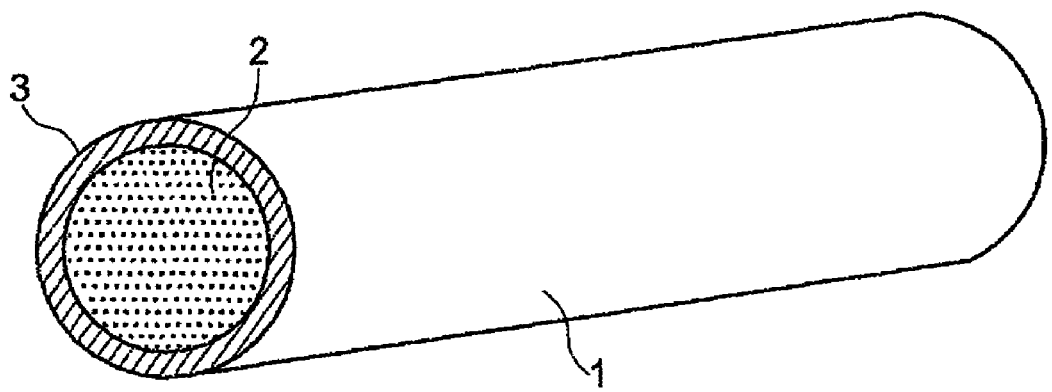

FIG. 1

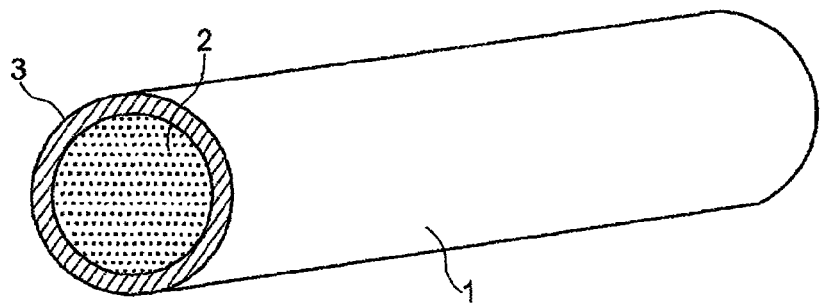

FIG. 3

TABLE 2

| NAME OF ARTICLES | COMPOUND AMOUNT (WEIGHT RATIO) |
|---|---|
| ·PURE WATER | 200 |
| ·EMARL 0 (LAURYL SODIUM SULFATE / MADE BY KAO CORPORATION) | 2.2 |
| ·$K_2S_2O_8$ (POTASSIUM PERSULFATE / WAKO PURE CHEMICAL INDUSTRIES, LTD.) | 0.5 |
| ·$NA_2SO_3$ (SODIUM SULFITE / WAKO PURE CHEMICAL INDUSTRIES, LTD.) | 0.05 |

FIG. 4

TABLE 3

| MATERIAL | COMPOUND AMOUNT (WEIGHT RATIO) |
|---|---|
| ·M-1110 (INCLUDE FLUORINE MONOMER) (MADE BY DAIKIN FINE CHEMICAL LABORATORY LTD.) | 57 |
| ·BA (N-BUTYL ACRYLATE) (MADE BY SHIN-NAKAMURA CHEMICAL CO., LTD.) | 33 |
| ·ACRYLIC ACID (MADE BY WAKO PURE CHEMICAL INDUSTRIES, LTD.) | 5 |

WHERE, M-1110 IS 2,2,2-TRIFLUOOETYL METACRYLATE.

FIG. 2

| MATERIALS | EMBODIMENTS | | | | | | | | COMPARATIVE EXAMPLES | |
|---|---|---|---|---|---|---|---|---|---|---|
| | 1 | 2 | 3 | 4 | 5 | 6 | 7 | 8 | 1 | 2 |
| ACRYLIC POLYMER | 80 | 70 | 95 | 50 | 90 | 65 | 62.5 | 50 | 40 | 90 |
| PEGDA | 20 | 20 | 0 | 30 | 5 | 20 | 20 | 20 | 0 | 0 |
| EGDM | 0 | 10 | 5 | 20 | 0 | 0 | 0 | 30 | 60 | 0 |
| BA | 0 | 0 | 0 | 0 | 5 | 7.5 | 10 | 0 | 0 | 10 |
| MMA | 0 | 0 | 0 | 0 | 0 | 7.5 | 17.5 | 0 | 0 | 0 |
| IRGACURA 184 | 0.2 | 0.3 | 0.05 | 0.5 | 0.1 | 0.35 | 0.32 | 0.5 | 0.2 | 0.1 |
| SHORT-TIME HEATRESISTANT TEMPERATURE | 160 | 180 | 170 | 185 | 160 | 180 | 180 | 190 | - | 110 |
| CORE MATERIAL | CLEAR AND COLORLESS | CLEAR AND COLORLESS | CLEAR AND COLORLESS | CLEAR AND COLORLESS | CLEAR AND COLORLESS | CLEAR AND COLORLESS | CLEAR AND COLORLESS | CLEAR AND COLORLESS | WHITE TURBIDITY | CLEAR AND COLORLESS |

HEAT-RESISTING PLASTIC OPTICAL FIBER AND MANUFACTURING METHOD THEREOF

BACKGROUND OF THE INVENTION

The present invention relates to a plastic optical transmission body, especially to a heat-resisting plastic optical fiber and a method of manufacturing the same.

The conventional plastic optical fiber is manufactured by hot-molding transparent thermoplastic polymer using a melting state as proposed in document 1.

Typical core material for this plastic optical fiber is polymethyl methacrylate or polystyrene, and such a plastic optical fiber is recently being put to practical use in many fields. As for the plastic optical fiber, making to high heat resistance will be hoped for the future. However, the upper bound temperature for which the above-mentioned optical fiber can be used is low with about 85° C. from the restriction on heat resistance of the resin which consists of polymethyl methacrylate or polystyrene.

On the other hand, a method of providing the heat resistance to a plastic optical fiber includes a method of using transparent heat-resisting thermoplastic resin such as polycarbonate or norbornene system polymers as described in document 5, and a manufacturing method in which after the preform of heat-resisting plastic is drawn using a melting state to form core material, and clad material is spread on outer thereof, radiation is applied to the plastic optical fiber obtained by drying the core material as described in document 2.

Moreover, there is a method of obtaining the plastic optical fiber with heat resistance as described in document 3, in which after making the clad tube, composition which is precursor of core material is injected into a clad tube and hardened.

[Document 1] Japanese Patent Publication No. 58-16163

[Document 2] Japanese Patent Publication No. 6-14127

[Document 3] Japanese Patent Application Laid-Open No. 57-102604

[Document 4] Japanese Patent Application Laid-Open No. 2004-212712

[Document 5] Kyoritsu Shuppan, Plastic Optical Fiber edited by POF consortium, pp 79-120 (1997)

BRIEF SUMMARY OF THE INVENTION

The heat resistance of an optical fiber depends on a characteristic of transparent heat-resisting thermoplastic resin used for the core material in the conventional method which uses transparent heat-resisting thermoplastic resin. However, there is no good material suitable for the resin, and thus the plastic optical fiber with high heat resistance cannot be obtained.

Moreover, in the latter method of obtaining the plastic optical fiber with heat resistance, in which after making the clad tube, composition which is precursor of core material is injected into a clad tube and hardened, three-dimensional bridge structure can be introduced into core polymer, and thus an optical fiber with high heat resistance can be obtained.

On the other hand, because the production unit of a fiber becomes the production unit of a clad tube from the restriction in the manufacturing process in which the precursor of core material is injected into a clad tube and hardened, the process in which the precursor of core material is injected into a clad tube and hardened must be batch-processed. Therefore, there are problems that productivity is low, and the cost increases.

An object of the present invention is to provide a heat-resisting plastic optical fiber, which excels in heat resistance and mass production, and a method of manufacturing the same.

In order to achieve the above-mentioned object, a heat-resisting plastic optical fiber according to one aspect of the present invention comprises a core which consists of transparent resin, and clad coated on the outer periphery of said core, which consists of the resin whose refractive index is lower than that of core, wherein precursor of material for said core material consists of the mixture of a group of monomers which contain polyfunctional monomer and transparent thermoplastic polymer.

Preferably, in the heat-resisting plastic optical fiber, said group of monomers essentially includes polyfunctional (metha)acrylic ester, and said transparent thermoplastic polymer contains polymethyl methacrylate.

Preferably, in the heat-resisting plastic optical fiber, said group of monomers consists of polyfunctional (metha)acrylic ester and mono function (metha)acrylic ester.

Preferably, in the heat-resisting plastic optical fiber, said core is one made by irradiating ultraviolet rays or electron beams thereto after said mixture is thermoformed like a string using a melting state, and making said group of monomers which includes polyfunctional monomer react to form crosslinking.

Preferably, in the heat-resisting plastic optical fiber, when said polyfunctional monomer is assumed to be A, and transparent thermoplastic polymer is assumed to be B, weight ratio A/B is 1-50/99-50, and preferably A/B is 5-40/95-60.

In addition, there is provided a method of manufacturing the heat-resisting plastic optical fiber which comprises a core which consists of transparent resin, and a clad coated on the outer periphery of said core, which consists of the resin whose refractive index is lower than that of core. The manufacturing method comprises the steps of: making a core by mixing the mixture of a group of monomers which contain polyfunctional monomer and transparent thermoplastic polymer in a meting state, thermoforming like a string with an extruding machine, and irradiating ultraviolet rays or electron beams to make said group of monomers which includes polyfunctional monomer crosslink, and forming a clad by spreading clad material on the outer periphery of said core and drying, or by extruding the same on the outer periphery of said core and coating.

Preferably, in the method of manufacturing a heat-resisting plastic optical fiber, the step of thermoforming like a string with an extruding machine is carried out at 60 to 130° C., and the step of forming a clad by spreading clad material on the outer periphery of said core and drying, or by extruding the same on the outer periphery of said core and coating is sequentially carried out.

More preferably, in the method of manufacturing a heat-resisting plastic optical fiber, the clad material spread on the outer periphery of said core is of an emulsion type.

A heat-resisting plastic optical fiber which excels in heat resistance and mass production can be obtained according to the present invention.

BRIEF DESCRIPTION OF THE SEVERAL VIEWS OF THE DRAWINGS

FIG. 1 is a perspective view showing a heat-resisting plastic optical fiber according to one embodiment of the present invention.

FIG. 2 is a table illustrating ratio of components of core monomer.

FIG. 3 is a table illustrating liquid solution making emulsion for clad.

FIG. 4 is a table illustrating composition ratio of monomer for clad material.

DETAILED DESCRIPTION OF THE PREFERRED EMBODIMENTS

Hereafter, a preferable embodiment of the present invention will be explained in detail with reference to attached drawings.

FIG. 1 is a perspective view showing a heat-resisting plastic optical fiber 1 according to one embodiment of the present invention. In heat-resisting plastic optical fiber 1 shown in FIG. 1, clad 3 having a thickness of 0.1 mm which consists of the resin whose refractive index is lower than that of core is coated on the outer periphery of core 2 which consists of transparent resin having an outside diameter of about 1.00 mm.

This core 2 is formed by heat-melting and mixing thermoplastic polymer which becomes puffing agent along with polyfunctional monomer which will form bridge structure to form precursor of core material, molding the precursor to the shape of the core by extrusion etc., and then irradiating ultraviolet rays or electron beams, etc. to crosslink polyfunctional monomer.

In a production line for this core, clad 3 is formed by spreading the clad material on the outer periphery of core 2 and drying or extruding the same, and thus heat-resisting plastic optical fiber 1 is manufactured.

The manufacturing process of a heat-resisting plastic optical fiber of the present invention is explained further.

(1) Transparent thermoplastic polymer is mixed with a group of monomers which include polyfunctional monomer by using a screw installed in a cylinder of a kneading machine and an extruding machine. The temperature at this time is properly set within the range of 80 to 150° C. according to an amount of mixing of polyfunctional monomer. For instance, when polyfunctional monomer is a little, the temperature of the kneading machine is set at a high temperature because the viscosity of the mixture is high. On the other hand, when an amount of mixing of polyfunctional monomer is large, the temperature of the kneading machine is set in a low temperature because the viscosity is low.

(2) A core of the optical fiber is obtained by heat-melting and extruding the mixture resin obtained by step (1). As for the extrusion conditions at this time, extrusion temperature (60 to 130° C.) and extrusion speed are set properly in consideration of the surface smoothness and the shape maintenance in the core obtained after extrusion.

(3) Next, the reactiveness monomer included in the core obtained by step (2) is made to react by irradiating ultraviolet rays, electron beams, gamma rays, or heat rays, etc. to the core. As a result, three-dimensional crosslinking is formed in the core resin.

(4) Afterwards, a clad is formed by using a method of spreading clad material of an emulsion type or a method of coating the clad material on the outer periphery of the core by extrusion, and the optical fiber is obtained by drying.

As for the manufacturing process of steps (1) to (4), It is preferable to carry out sequentially on the same production line.

Because polyfunctional monomer mixed with transparent thermoplastic polymer which plays the role of the puffing agent, which has a lot of reactive points forms crosslinking by irradiation of ultraviolet rays, electron beams, etc., the optical fiber which has a core with heat resistance higher than that of the conventional core.

Because the optical fiber with high heat resistance of the present invention can be produced by heat-melting and extruding, the batch processing etc. is not needed. In addition, because it is possible to manufacture completed product on the same production line, a low-cost, excellent in mass-produce optical fiber can be offered.

In the above-mentioned manufacturing process, the process where the monomer of the core resin is made to react in step (3) may be carried out after the formation of the clad in step (4).

Moreover, the transparent thermoplastic polymer is not be limited to specific material, but is transparent and thermoplastic. The polymethyl methacrylate system resin which is copolymer consists of methyl (metha)acrylate and (metha) acrylic ester is preferable as this polymer. For instance, the polymer which consists of methyl methacrylate and butyl acrylate, etc. is preferable.

Moreover, the one whose copolymer is transparent when reacting in transparent thermoplastic polymer can be used as polyfunctional monomer blended to transparent thermoplastic polymer. When polymethyl methacrylate system material is used for the above-mentioned transparent thermoplastic polymer, it is preferable to use polyfunctional (metha)acrylic ester at least. At this time, it is also possible to blend monofunction (metha)acrylic ester to polyfunctional monomer which contains polyfunctional (metha)acrylic ester if necessary.

Multifunctional (metha)acrylic acid ester applicable to the present invention includes: ethylene glycol dimethacrylate, diethylene glycol dimethacrylate, triethylene glycol dimethacrylate, polyethylene glycol #200 dimethacrylate, polyethylene glycol #400 dimethacrylate, polyethylene glycol #600 dimethacrylate, polyethylene glycol #1000 dimethacrylate, 1.3-butylene glycol dimethacrylate, 1.6-hexanediol dimethacrylate, neo-pentyl glycol dimethacrylate, polypropylene glycol #400 dimethacrylate, 2-hydroxy 1.3 dimethcryloxypropane, 2.2-bis[4-(methacryloxy ethoxy) phenyl]propane, 2.2-bis [4-(methacryloxy diethoxy)phenyl] propane, 2.2-bis [4-(methacryloxy polyethoxy)phenyl] propane, polyethylene glycol #200 diacrylate, polyethylene glycol #400 diacrylate, polyethylene glycol #600 diacrylate, 1.6-hexanediol diacrylate, neo-pentyl glycol diacrylate, tripolypropylene glycol diacrylate, polypropylene glycol #400 diacrylate, polypropylene glycol #700 diacrylate, 2.2-bis [4-(acryloxy diethoxy)phenyl] propane, 2-hydroxy 1-acryloxy, 3-methacryloxy propane, trimethylolpropane trimethacrylate, trimethylol triacrylate, tetramethylolmethane triacrylate, and tetramethylolmethane tetracrylate.

Moreover, monofunction (metha)acrylic ester applicable to the present invention Includes: methoxy diethylene glycol methacrylate, methoxy polyethylene glycol #230 methacrylate, methoxy polyethylene glycol #400 methacrylate, methoxy polyethylene glycol #1000 methacrylate, β-methacryloyloxyethylhydrogen phthalate, β-methacryloyloxyethylhydrogen succinate, 3-chloro-2-hydroxypropylmethacrylate, stearylmethacrylate, phenoxy ethylacrylate, phenoxy ethylene glycol acrylate, phenoxy polyethylene glycol acrylate, methoxy polyethylene glycol #400 acrylate, β-acryloyloxyethylhydrogen succinate, and lauryl acrylate.

Moreover, It is preferable that ratio A/B of amount A of mixing of polyfunctional monomer and amount B of mixing of transparent thermoplastic polymer is 1 to 50 parts by weight/99 to 50 parts by weight, and more preferably, 5 to 40 parts by weight/95 to 60 parts by weight. The core with high heat resistance cannot be obtained even if the electron beam etc. are irradiated, because the density of crosslinking of transparent thermoplastic polymer is low when ratio A/B is below 1 part by weight/99 parts by weight. Moreover, when A/B is more than 50 parts by weight/50 parts by weight, it is difficult to obtain an optical fiber with high optical transparency because the core polymer obtained after polyfunctional polymer is made to react due to the irradiation of electron beams becomes clouded.

EMBODIMENTS

Embodiments of the present invention will be explained hereinafter along with comparative examples.

FIG. 2 is a table showing ratio of components of core monomer in embodiments 1 to 8 and comparative examples 1 and 2.

Details of each component are as follows in FIG. 2.

Acrylic polymer: Acrylic resin corpuscle and LG6A (made by Sumitomo Chemical Co., Ltd.)

PEGDA: Polyethylene glycol diacrylate [NK ester A-200 (made by Shin-Nakamura Chemical Co., Ltd.)]

EGDM: Ethylene glycol dimethacrylate (made by Shin-Nakamura Chemical Co., Ltd.)

IRGACURE 184: Photochemical polymerization initiator (made by Chiba Specialty Chemicals Co., Ltd.)

BA: n-Butyl acrylate (made by Shin-Nakamura Chemical Co., Ltd.)

MMA: Methyl methacrylate (made by Shin-Nakamura Chemical Co., Ltd.)

Monomer liquid solution was made by dissolving each component mentioned above, that is, polyfunctional monomers such as PEGDA, EGDM, and an acrylic (metha) system monomers such as BA, MMA by mixing, adding a specified amount of photoinitiator (IRGACURE 184) to this, and dissolving them by stirring.

The raw material for the core material was made by adding monomer component to the acrylic resin corpuscle and LG6A (made by Sumitomo Chemical Co., Ltd.), and mixing them at 80 to 150° C. until becoming uniform.

Moreover, the clad material was made by using the following method.

First of all, the liquid solution making emulsion for clad is adjusted according to the components in FIG. 3.

Next, the monomer for the clad material in FIG. 4 is adjusted.

(1) Emulsion Polymerization

The pure water 200.00 g shown in FIG. 3 was put into a three start flask which is provided with a stirring machine, a thermometer and a nitrogen gas induction tube, and Emal 0 (emulsifying agent), $K_2S_2O_8$, and $Na_2SO_3$ were added to this and stirred to dissolve them to pure water.

Next, the monomer component shown in FIG. 4 was provided, and stirred for five minutes or more until the whole is emulsified. And then, temperature was raised to 80° C., and kept warm at 80° C. to cause the polymerization reaction.

(2) Making the Emulsion to Ammonium

The emulsion that the polymerization reaction is caused in step (1) was cooled up to the room temperature. The same amount of ammonium water as acrylic acid content was added and stirred enough to make the emulsion to ammonium. As a result, the clad material of an emulsion type was made.

As for the manufacture of an optical fiber, the raw material for a core shown in above-mentioned table 1 was extruded by an extruding machine like a fiber first. Next, ultraviolet lights were irradiated to make monomer component of the core crosslink. Continuously, the core was soaked in the clad material of the emulsion type to coat the clad on the core. Finally, heating process and drying process were carried out. As a result, a crosslink type plastic optical fiber with the clad was completed.

In embodiments 1 to 8, an optical fiber with a core of 1.0 mm in diameter and a clad of 0.1 mm in thickness was obtained. When LED incident light of the wave length of 660 nm was provided from one end of the optical fiber obtained, outgoing light from the other end is recognized.

The short-time heat resistance temperature is defined as a temperature when optical power of 30° C. in room temperature is reduced up to 70% or less due to temperature rise in the case that the middle part of 2 m optical fiber is put in a constant temperature bath, the LED incident light of the wave length of 660 mm is provided from one end, and outgoing light from the other end is received by a optical power meter while rising temperature of the constant temperature bath by 1° C./minute.

Results in embodiments 1 to 8 show that the short-time heat resistance temperature were 150° C. or more. Namely, excellent heat resistance was confirmed.

On the other hand, core polymer composition after hardening by using ultraviolet rays became clouded in comparative example 1. Namely, that the performance of optical transmittance is low was confirmed. Further, in comparative example 2, the heat resistance is lost at 110° C. though the core is clear and colorless.

The invention claimed is:

1. A heat-resisting plastic optical fiber comprising:
   a core which consists of a transparent resin, and
   a clad coated on the outer periphery of said core, which consists of a resin whose refractive index is lower than that of said core,
   wherein a precursor of material for said core consists of a mixture of a group of monomers which contain a polyfunctional monomer and a transparent thermoplastic polymer.

2. The heat-resisting plastic optical fiber according to claim 1, wherein said group of monomers essentially includes polyfunctional (metha) acrylic ester, and said transparent thermoplastic polymer contains polymethyl methacrylate.

3. The heat-resisting plastic optical fiber according to claim 1, wherein said group of monomers consists of polyfunctional (metha) acrylic ester and mono function (metha) acrylic ester.

4. The heat-resisting plastic optical fiber according to claim 1, wherein said core is one made by irradiating ultraviolet rays or electron beams thereto after said mixture is thermoformed like a string using a melting state, and making said group of monomers which includes polyfunctional monomer react to form crosslinking.

5. The heat-resisting plastic optical fiber according to claim 1, wherein when said polyfunctional monomer is assumed to be A, and said transparent thermoplastic polymer is assumed to be B, a weight ratio A/B is 1-50/99-50, and preferably A/B is 5-40/95-60.

6. A method of manufacturing a heat-resisting plastic optical fiber comprising a core which consists of transparent resin, and a clad coated on the outer periphery of said core, which consists of a resin whose refractive index is lower than that of said core, which comprises the steps of:

making said core by mixing the mixture of a group of monomers which contain a polyfunctional monomer and a transparent thermoplastic polymer in a meting state, thermoforming like a string with an extruding machine, and irradiating ultraviolet rays or electron beams to make said group of monomers which includes polyfunctional monomer crosslink, and forming a clad by spreading clad material on the outer periphery of said core and drying, or by extruding the same on the outer periphery of said core and coating.

7. The method of manufacturing a heat-resisting plastic optical fiber according to claim 6, wherein the step of thermoforming like a string with an extruding machine is carried out at 60 to 130° C., and the step of forming a clad by spreading clad material on the outer periphery of said core and drying, or by extruding the same on the outer periphery of said core and coating is sequentially carried out.

8. The method of manufacturing a heat-resisting plastic optical fiber according to claim 6, wherein said clad material spread on the outer periphery of said core is of an emulsion type.

* * * * *